(12) United States Patent
Dyne et al.

(10) Patent No.: US 6,272,508 B1
(45) Date of Patent: Aug. 7, 2001

(54) GUIDE BUILDER FOR DOCUMENTATION MANAGEMENT IN COMPUTER APPLICATIONS

(75) Inventors: James Fulton Dyne, Perrineville; Linda Catherine Norton, Tinton Falls, both of NJ (US)

(73) Assignee: Avaya Technology Corp., Basking Ridge, NJ (US)

( * ) Notice: Subject to any disclaimer, the term of this patent is extended or adjusted under 35 U.S.C. 154(b) by 0 days.

(21) Appl. No.: 09/170,935

(22) Filed: Oct. 13, 1998

(51) Int. Cl.[7] .................................................. G06F 17/21
(52) U.S. Cl. .......................................... 707/530; 707/500
(58) Field of Search .................................. 707/500, 511, 707/512, 530, 531

(56) References Cited

U.S. PATENT DOCUMENTS

| | | | |
|---|---|---|---|
| 5,267,155 | * | 11/1993 | Buchanan et al. .................... 707/540 |
| 5,313,394 | * | 5/1994 | Clapp .................................... 707/531 |
| 5,446,653 | * | 8/1995 | Miller et al. .............................. 705/4 |
| 5,655,130 | * | 8/1997 | Dodge et al. ......................... 707/511 |
| 5,692,206 | * | 11/1997 | Shirley et al. ........................ 707/531 |
| 5,987,480 | * | 11/1999 | Donolhue et al. .................... 707/501 |
| 6,055,542 | * | 4/2000 | Nielsen et al. ........................ 707/104 |

\* cited by examiner

Primary Examiner—Stephen S. Hong
(74) Attorney, Agent, or Firm—Gibbons Del Deo, Dolan, Griffinger & Vecchione

(57) ABSTRACT

An easy-to-use, user-specific documentation customized according to the local environment and needs of the end-user is disclosed. The environmental if-statement feature allows the user to specify the documentation relevant to his or her local environment and needs. The automated translation feature allows the user to create end-user documentation in various languages while working with software screens in his or her native language. The button label feature allows the user to automate the creation of button labels for individual telephones or for groups of telephones in a large system. The platform sharing feature allows similar software applications to share a common platform and user interface with each application contributing to a complete set of master end-user documents.

5 Claims, 8 Drawing Sheets

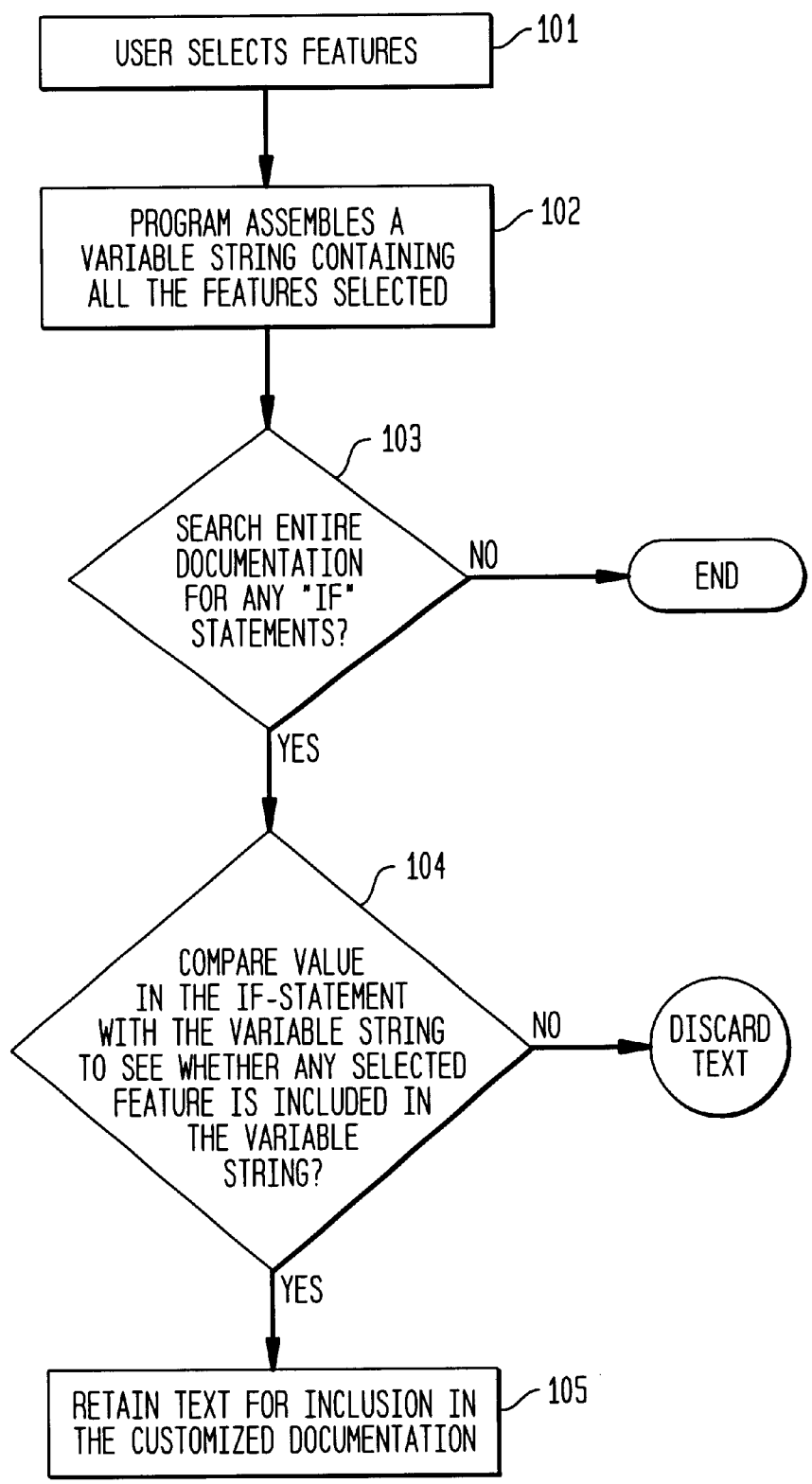

FIG. 2A

User clicks...
Build Guides
→ Program finds...Features WHERE SelFlag Like "T"

FIG. 2B

| Item Name | SelFlag | SendCode |
|---|---|---|
| Digital Networking | F | DN |
| Email | T | EM |
| Fax Messaging | T | FM |
| Integrated Messaging | F | IM |
| Message Manager | T | MM |
| Outcalling | F | OC |

FIG. 2C

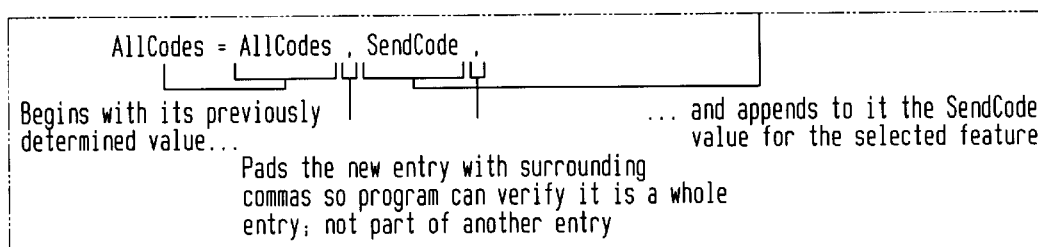

AllCodes = AllCodes , SendCode ,

Begins with its previously determined value...
Pads the new entry with surrounding commas so program can verify it is a whole entry; not part of another entry
... and appends to it the SendCode value for the selected feature

FIG. 2D

Sending a Voice .IFCODE FM:or Voice-Fax .ENDIFCODE FM:Message

1. Press 1 from the Main Menu

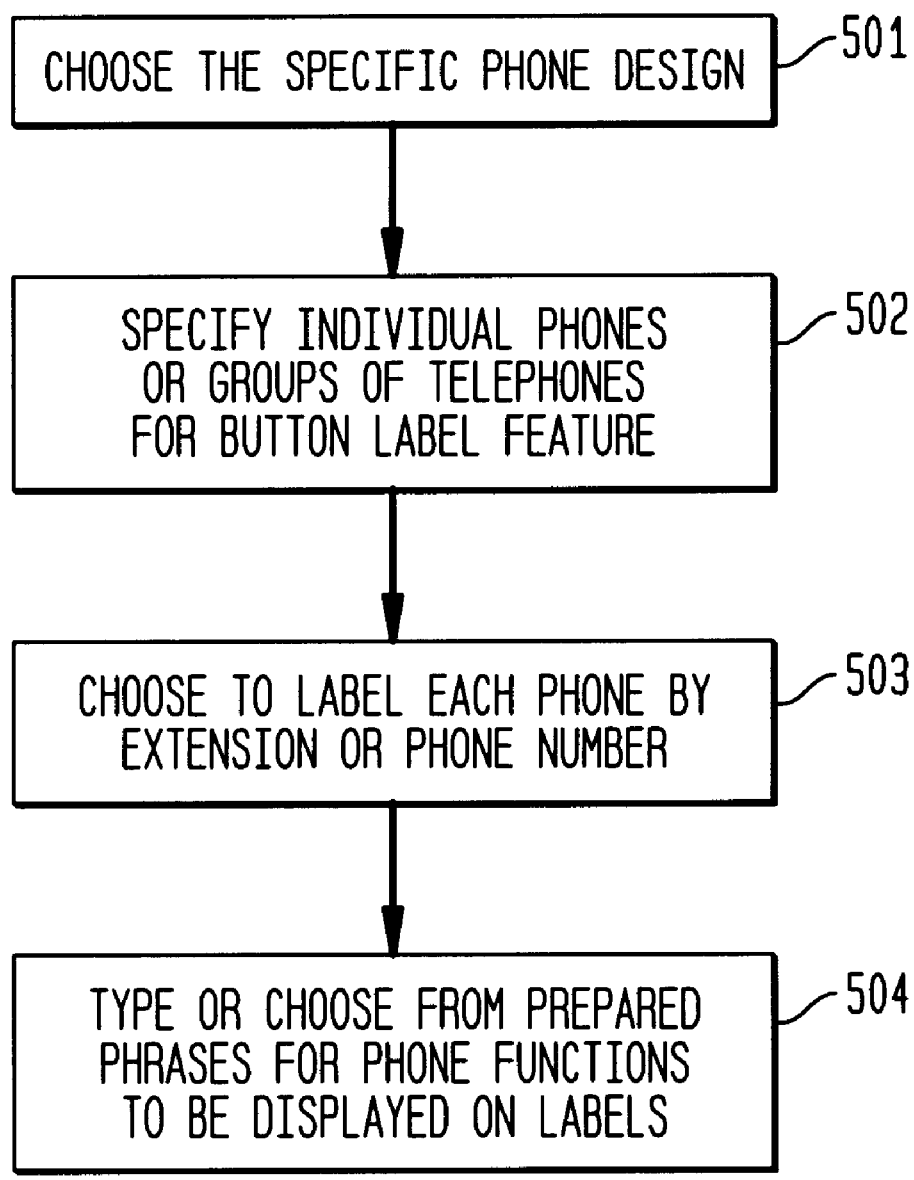

FIG. 6A

Row1,, Column1 AD,, Column2,, Column3,, Column4,, Row10,, Column1,, Column2,, Column3,, Column4,, Row11,, Column1,, Column2,, Column3,, Column4,, Row12,, Column1,, Column2,, Column3,, Column4,, Row13,, Column1,, Column2,, Column3,, Column4,, Row14,, Column1,, Column2,, Cloumn3,, Column4,, Row15,, Column1,, Column2,, Column3,, Column4,, Row16,, Column1,, Column2,, Column3,, Column4,, Row17,, Column1,, Column2,, Column3,, Column4,, Row18,, Column1,, Column2,, Column3,, Column4,, Row19,, Column1,, Column2,, Column3,, Column4,, Row2,, Column1,, Call Forward,, Column2,, Column3,, Column4,, Row3,, Column1,, Column2,, Column3,, Column4,, Row4,, Column1,, Column2,, Column3,, Column4,, Row5,, Column1,, Column2,, Column3,, Column4,, Row6,, Column1,, Column2,, Column3,, Column4,, Row7,, Column1,, Column2,, Column3,, Column4,, Row8,, Column1,, Column2,, Column3,, Column4,, Row9,, Column1,, Column2,, Column3,, Column4,, Row20,, Column1,, Column2,, Column3,, Column4,, Row21,, Column1,, Column2,, Column3,, Column4,, Row22,, Column1,, Column2,, Column3,, Column4,, Row23,, Column1,, Column2,, Column3,, Column4,, Row24,, Column1,, Column2,, Column3,, Column4,, Row25,, Column1,, Column2,, Column3,, Column4,,

FIG. 6B

If the user is creating a range of cards, the program breaks the phone number into chunks...

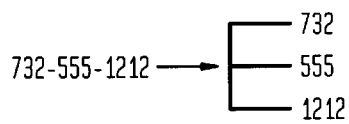

732-555-1212 → 732 / 555 / 1212

...increments the last chunk by advancing it to the next number for each phone within the designated range, then reassembling the pieces to form a complete phone number.

FIG. 6C

A series of nested loops, using a common algorithm, determine the placement of each label on the page-working horizontally, then vertically to complete each page.

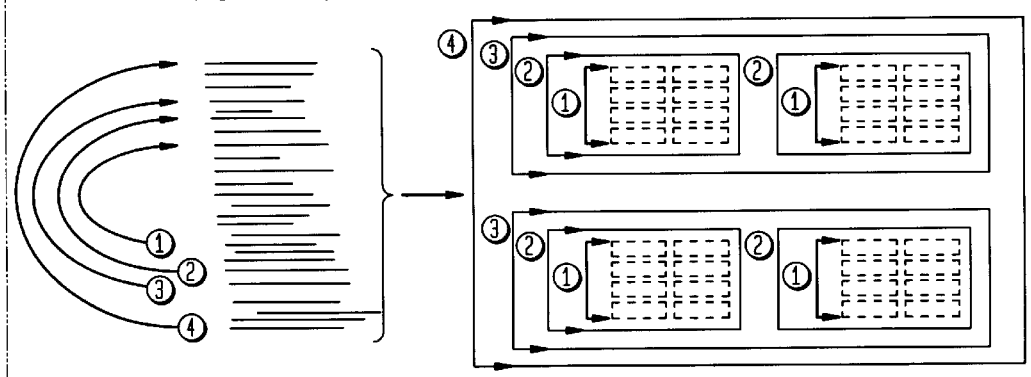

… …

GUIDE BUILDER FOR DOCUMENTATION MANAGEMENT IN COMPUTER APPLICATIONS

FIELD OF INVENTION

The present invention is in the field of documentation of computer software applications.

BACKGROUND OF INVENTION

The invention is related to computer-implemented programs that create and manage customized documentation of applications for a single person or a group of users in a computer-implemented system.

1. Environmental If-Statements

Current methods of distributing technical documentation for reconfigurable computer-implemented applications require the user to search a multitude of feature descriptions and procedures while he or she deciphers which parts of the documentation apply to current needs. Moreover, many features in the technical documentation contain different instructions applicable in various application environments, depending upon a combination of parameters related to the reconfigured system format. This uncustomized format requires the user to do a significant amount of research within the documentation itself in order to obtain the proper input instructions that cause the computer application to perform tasks assigned by the user or reconfigured for different system environments.

There is thus a need for a better way of organizing and managing documentation or computer applications. An easy-to-use, flexible, user-specific product documentation method is needed to tailor to different end-users or to conform to a multitude of reconfigurable operating environments.

2. Automated Translations

Current methods of technical documentation distribute foreign-language material as paper-based documents. This requires the administrator to keep a large amount of documentation on-hand to support end-users who might speak any number of languages. As the pool of end-users grows larger, the administration of documentation in foreign languages becomes increasingly burdensome. Product upgrades complicate this process, as existing documentation must be junked and replaced. This results in documentation that is wasteful and cumbersome. An entirely new set of foreign language translations of the documentation is needed for each revision in the original language. Because of the burden in administrating foreign-language documentation, it may inhibit the motivation of the end-user to upgrade to newer applications.

There is a need for a better, more efficient way of administrating foreign language documentation. An effective, easy-to-use method of creating product documentation in multiple languages is needed. Also needed is an automated translation feature that allows the end-user to work with software screens in the local language, along with the ability to create end-user documentation in another language.

3. Button Labels

In most modem-day offices, end-users no longer have a typewriter available to create typed button labels for telephones, and writing the labels by hand is unacceptable. This becomes particularly problematic for large telephone systems. There is a long-felt need among end-users for a computer-based button labeling feature for telephones. Consequently, many end-users have created "home-grown" spreadsheet and document templates in an attempt to make this process easier. However, this still requires a considerable amount of time to create button labels for a large installation. Further, it does not address the need to duplicate the labels and increment the phone number for a range of telephones. Updating labels as the telephone system grows larger requires a new series of label typing from the beginning.

There is therefore a need for a button label feature that allows the end-user to automate and customize the creation of button labels for individual telephones, or groups of telephones.

4. Platform Sharing

Conventional methods of implementing software applications require each application to have its own platform. This puts an unduly cumbersome strain on the hardware and software resources of the computer in an environment where multiple versions of a software application are running to provide services to the end-user.

There thus exists a need for a computer-implemented program that allows similar software applications or different versions of a software application to share a common platform and user interface, where each application contributes to a complete set of master end-user documents.

SUMMARY OF THE INVENTION

The advantages of the four inventive features can be summarized as follows:

1. Environmental If-Statements

The present invention customizes technical documentation based on features selected by the user or features pre-selected for respective system formats in a reconfigurable computer-related system. According to the method of the invention, an efficient computer-implemented application is provided that removes all irrelevant information typically contained in any end-user document. By allowing the end-user to specify the appearance of the current local environment, the invention removes all unnecessary and potentially confusing instructions from the end-user documentation. The user then ends up with documentation that is more concise, efficient and customized to current needs of the user in the local environment.

The method of the invention also gives the system administrator control over information that end-users receive. Further, the invention increases user productivity by matching documentation to specific learning preferences. The invention advantageously provides user-specific documentation that is available in a timely manner and substantially reduces cost. The invention removes the need to purchase and retain multiple hard-copy documents required to support future users of the applications because it provides documentation customized for each user whenever the need arises.

2. Automated Translations

The automated translation feature in the present invention allows the creation of foreign language documentation on-demand. This feature permits a person who may not speak or understand the target language to create documentation in that language. The automated translation feature in the invention can be used by any software application that requires documentation in a variety of languages. This feature can be advantageously adapted to provide international products, support, or information documentation in various computer-implemented systems. Further, this feature can be used in conjunction with the environmental if-statement feature to provide customized translation documentation for users in different operating environments.

3. Button Labels

The button label feature in the present invention automates the creation of button labels for telephones in various ranges. The end-user can specify a single telephone number or a range of telephone numbers prior to selecting the actual labels so that the methodology, as implemented in computer software, can generate a button label for each telephone number. The button label feature automates and customizes the label-making process for a multitude of telephony environments and removes unnecessary administrative burden in printing labels for each telephone.

4. Platform Sharing

The platform sharing feature in the present invention allows different software applications to have the same "look and feel," to share enhancements, and to contribute to a set of master applications without burdening the computer with multiple versions of platform software to support each application. In particular, the platform sharing feature in the invention allows different documentation applications to share an entire set of enhancement capabilities under the umbrella of a set of master end-user documents without the cumbersome multiplicity of application versions to support each running application. This platform sharing feature is able to support any group of software applications similarly implemented by a computer. The feature is particularly suitable for a large system seeking to provide a comprehensive documentation solution for a broad user base. In essence, the inventive feature serves as a universal documentation interface for groups of similar applications implemented by a computer. Moreover, this platform sharing feature can be adopted to provide interface support to a broad spectrum of similarly structured documents, and even to offer documentation on-line with the same user interface.

BRIEF DESCRIPTION OF THE DRAWINGS

FIG. 1 illustrates the environmental if-statement feature in the invention.

FIG. 2A shows the operation of the "Build Guides" icon in the environmental if-statement feature.

FIG. 2B shows the ItemName table used in the environmental if-statement feature.

FIG. 2C shows how the string is coded and appended in the environmental if-statement feature.

FIG. 2D shows how code is embedded in the environmental if-statement feature.

FIG. 5 illustrates the button label feature in the invention.

FIG. 6A shows the operation of the button label feature for individual telephones.

FIG. 6B shows the operation of the button label feature for groups of telephones.

FIG. 6C shows the nested loop algorithm in the button label feature.

DETAILED DESCRIPTION

Figure 3:
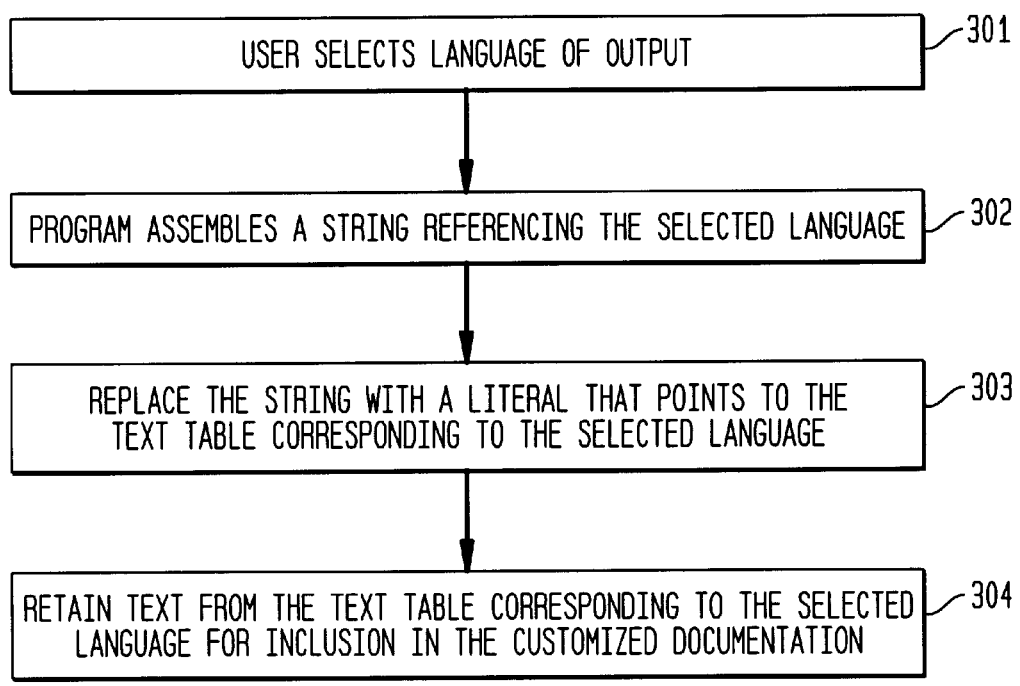
FIG. 3 illustrates the operation of the automated translation feature in the invention.

The present invention has four inventive features: (1) environmental if-statements, (2) automated translation, (3) button labels, and (4) platform sharing.

1. Environmental If-Statements

Most major computer-implemented applications include a database of technical documentation related to the operation of such an application. In many such applications, users can access portions of the technical documentation to explain certain features in the application by using on-screen graphical user interface (GUI) functions. While various indexing approaches are provided for searching such technical documentation in respect to a particular feature of interest to a user, no systematic approach is available for tailoring a set of documentation to the feature environment for a specific user, the only alternative being a reproduction of the entire set of such documentation.

In accordance to the method of the invention, among the indexing characteristics of the documentation database is the inclusion with each discrete portion of the documentation of one or more "environmental if-statements" which relate that documentation portion to one or more features provided in the application. The invention operates on the correlation between application features and the environmental if-statements of related documentation portions to provide a set of documentation customized for the feature environment of a particular user.

The environmental if-statement process of the invention allows the end-user to specify which computer applications are available in his or her environment. In an illustrative embodiment, computer software implementing the method of the invention uses this information to sift through all available end-user information in the technical disclosure to create a document containing information relevant to this particular user only. A set of such software has been developed by the assignee of this invention, Lucent Technologies, Inc., such software being designated Guide Builder™. Through operation of such software, excess documentation that may be irrelevant for the end-user is eliminated.

The user can use the environmental if-statement feature by going through several steps. Referring to FIG. 1, the user first selects features (Step 101) that exist in the current environment and requests a document. In a telephony system, for example, the user can select features such as automatic redial, automatic call back, telephone conferencing, etc. The computer program assembles a variable string containing an encoded list of all of the selected features. See Step 102. Then, the computer program searches for if-statements in the documentation. See Step 103. For each if-statement found, the computer program compares the value in the if-statement against the variable string of encoded feature names in Step 104. If the corresponding encoded feature name is included in that string, the text is retained (Step 105) in the target document; otherwise, it is discarded. This allows the finished document to be completely customized, both in the inclusion and exclusion of sections and the feature variations that are specific to the user's system, e.g., a telephony system. For instance, the computer program can be used for organizing technical documentation of telephony features for applications such as the DEFINITY® ECS telephone system from Lucent Technologies, Inc.

Table 1 (below) shows, in pseudo code, how a sub-routine of the environmental if-statement process creates a list of codes and assembles the variable string in Step 102.

1. Public Sub CreateListOfAllSentCodes( )
2. Dim srchsect As String
3. srchsect = "SELECT DISTINCTROW Item.SendCode, . . . FROM Item INNER JOIN TypeItem ON . . . WHERE Item.SelFlag Like" & Chr(34) & "T" & Chr(34);"
4. dataGlobal.RecordSource = srchsect
5. dataGlobal.Refresh
6. If dataGlobal.Recordset.EOF < > "True" Then
7. dataGlobal.Recordset.MoveFirst
8. Do
9. SendItemCodes = SendItemCodes & "," & dataGlobal.Recordset("SendCode") & ","
10. dataGlobal.Recordset.MoveNext
11. Loop Until dataGlobal.Recordset.EOF = "True"
12. End If Referring to Table 1, in assembling the variable string, Line 1 marks the beginning of the routine that creates a code list. Line 2 holds the variable string that populates the global data control, or "dataGlobal." Line 3 builds the variable string that populates the named data control. Line 4 writes the content of the variable string to the record source ("RecordSource") property of the data control. Line 5 evaluates the variable string for this particular data control and updates all connected controls.

Line 6 shows the beginning of the conditional statement that goes through the entire file. The conditional statement goes to the end of the file if no records meet the qualifications outlined in the variable string. Line 7 then activates the first record set in the global data control, or "dataGlobal."

Line 8 starts a loop statement and continues to the "Loop Until" (Line 11) that marks the end of the loop. Line 9 creates a concatenated list of each code sent by a selected item. Line 10 then moves to the next record. Line 11 causes the loop to exit when the last record has been processed. Line 12 marks the end of the conditional statement that started in Line 6. At this point, the code list is complete and the computer program can start the document customization process by looking for if-statements embedded in the documentation text.

FIGS. 2A, 2B, 2C and 2D illustrate different parts of the environmental if-statement feature in the invention.

The end-user first selects the features he or she desires to be operable from the on-screen menu by using GUI functions, which are well known in the art. For instance, in a telephony system, the user can select features such as video conferencing, voice mail management, etc. Referring to FIG. 2A, the end-user clicks on the on-screen button (or GUI icon) of "Build Guides" to start the document customization process. The computer program then displays a list of features in an on-screen GUI menu from which the user can select the features she or he desires.

The computer program finds the features currently enabled by the user and sets a flag corresponding to each feature to indicate whether the feature is wanted or unwanted. If a feature is selected, the computer program sets a flag value of "T" that corresponds to the feature. See FIG. 2A. Referring to the ItemName table of FIG. 2B, the flag is set to either "T" or "F" indicating the item in ItemName as one to be selected or discarded, respectively. For instance, because the user selected the item "Fax Messaging," it is applicable in the current environment and thus is assigned a "T" flag, as shown in the SelFlag column in the table.

The computer program then loops through each feature in the ItemName table of FIG. 2B where SelFlag equals "T" and appends its SendCode value to the list of AllCodes. The SendCode value is sent to be included in the list of AllCodes for later code processing in the document customizing process. For instance, the item of "Fax Messaging" has a SendCode value of "FM" which is included in the AllCodes list. The computer program creates a finished string from the AllCodes list by stringing the code strings together (as shown in FIG. 2C) in the form of:

AllCodes=AllCodes, SendCode,

The computer program starts with a pre-existing value, i.e., the first instance of AllCodes. AllCodes represents a string with previously determined values. Then, the computer program appends the value in AllCodes with the value in SendCode (which is the current value) for the selected feature that it corresponds to. A completed string looks like the following:

AllCodes=,SendCode(1),SendCode(2),SendCode(3),

The surrounding commas pad the new entry of SendCode so that the computer program can verify it is a whole entry instead of a part of another entry. This allows the end-user to create strings as the computer program proceeds to customize documentation. Referring to the table of FIG. 2B, the computer program loops through each feature where SelFlag equals "T" and appends its SendCode value to the list of AllCodes. According to the table, "E-Mail," "Fax Messaging" and "Message Manager" are the features with SelFlag of "T." The features have SendCode values of "EM," "FM" and "MM," respectively. The string becomes:

AllCodes=,EM,,FM,,MM,

The computer program then compiles the finished documentation and locates the start and end of each if-statement. Each feature in the system, e.g., DEFINITY®, has an accompanying if-statement. For instance, FIG. 2D shows how an exemplary feature "Voice-Fax" is encoded with an if-statement. An if-statement is encoded by embedding ".IFCODE SendCode" before a feature and ".ENDIFCODE SendCode" after the same feature. SendCode represents the value assigned to the feature that ".IFCODE" and ".ENDIF-CODE" are encoding. ".IFCODE" and ".ENDIFCODE" act as delimiters for demarcating the feature being encoded. As in FIG. 2D, the coding of the system features looks like:

Sending a Voice.IFCODE FM:or Voice-Fax.ENDIFCODE FM: Message

By locating the beginning and the end of each if-statement, the computer program retains the embedded text only if the string of AllCodes contains the referenced SendCode. For instance, since "Fax Messaging" has a "T" flag, the computer program looks for its SendCode "FM" in the code-embedded documentation and retains texts for the feature "Voice-Fax" surrounded by the start and end of the if-statement for the referenced code "FM." The computer program then outputs a newly customized document that contains text only relevant to the selected features such as "Voice-Fax."

Table 2 is a more detailed illustration of the environmental if-statement feature in pseudo code form. The sub-routine shown in Table 1 is a sub-routine that creates a list of codes and assembles the variable string for operation in the master source code as shown in Table 2. The code in Table 2 identifies if-statements in the documentation, separates portions of text from embedded if-statements in the documentation, and retrieves the SendCode value for the corresponding feature in the system. The code then uses the sub-routine in Table 1 to form a concatenated string, assembles the retrieved texts and creates a customized documentation.

Table 2 is shown below, as follows:

```
1.   Do
2.   RemainingOldString = dataTextActive.Recordset("TextString")
3.   Do
4.   If dataTextActive.Recordset("TextString") Like "*.IFCODE*"
     Then
5.   IdentifyFoundCode
6.   SeparateTextBeforeCode
     FromTextWithinCodeAndTextAfterCode
7.   PaddedFoundCode = "," & FoundCode & ","
8.   FoundIt = InStr(SendItemCodes, PaddedFoundCode)
9.   If FoundIt < > 0 Then
10.  RemainingOldString = EvolvingNewString &
     MiddleStringToBeConverted & RemainingOldString
11.  Else
12.  RemainingOldString = EvolvingNewString &
     RemainingOldString
13.  End If
14.  End If
15.  FoundAnother = InStr(RemainingOldString, ".IFCODE")
16.  Loop Until FoundAnother = 0
17.  Do
18.  EvaluateEachCharacterOfRemainingTextBlock
19.  Loop While ContainsTextFlag = 0 And CharCounter <90
20.  If ContainsTextFlag = 0 Then
21.  dataTextActive.Recordset.Delete
22.  Else
23.  dataTextActive.Recordset.Edit
24.  dataTextActive.Recordset("TextString") = RemainingOldString
25.  dataTextActive.Recordset.Update
26.  End If
27.  dataTextActive.Recordset.MoveNext
28.  Loop Until dataTextActive.Recordset.EOF = "True"
```

Referring to Table 2, Line 1 starts a loop and continues to the outer-"Loop Until" (Line 28). Line 2 copies the original text string field ("TextString") to the variable "RemainingOldString." Line 3 starts another loop, continues to the first inner "Loop Until" (Line 16). Line 4 starts a conditional statement that checks if the original text string contains an "IFCODE" statement. Line 5 calls a routine that identifies the code that the computer program is looking for, i.e., the embedded "IFCODE" statement, if any. Line 6 calls a routine that separates the text before and after the embedded code. Line 7 pads the code that the computer program is looking for with commas acting as delimiters. Line 8 assigns a numeric value of 0 or up to the "FoundIt" variable by looking for the "FoundCode" value (such as "FM" for the Fax Messaging function or whatever code the computer program is currently working with), in the list of codes generated in the "CreateListOfAllSentCodes" routine, as shown in Table 1. If Line 8 produces a 0, then the search string is not found. Any other number means that the search string is found.

Line 9 shows another conditional statement. The search string is found if the value in "FoundIt" is not 0, which causes Line 10 to append the remaining old string ("RemainingOldString") with the middle string (the "If" text) plus the end of the old string. Otherwise, Line 12 appends the evolving new string "EvolvingNewString" with the end of the old string and discards the middle string (the "If" text). Line 13 marks the end of the inner conditional statement started in Line 9. Line 14 marks the end of the main conditional statement (began in Line 4) that executes only if the original text string contained an IF statement. Line 15 assigns a numeric value of 0 or up to the variable "FoundAnother" by looking for the word ".IFCODE" in the newly modified text string. The search string is not found if Line 15 produces a 0. Any other number means that the search string is found. Line 16 goes back to the second Do statement (Line 3) until no more occurrences of ".IFCODE" are found in this text block.

Line 17 marks the beginning of another "Do" loop. Line 19 repeats this "Do" loop (started in line 17) so long as the value in "ContainsTextFlag" is 0. The value of 0 means that the computer program cannot find any usable text in the string. Line 20 is a conditional statement that determines whether the computer program has found any usable text in the string. If Line 20 is true, Line 21 deletes the unneeded record since the revised text block does not contain any upper case characters (which would appear in a sentence or any call to an artwork file).

Line 22 splits off the conditional statement provided the computer program finds any usable strings. Line 23 opens up the current record for editing. Line 24 copies the revised text block back into the "TextString" field in the database. Line 25 writes the changed values (those sandwiched between the ".Edit" and the ".Update" statements) to the database. Line 26 marks the end of the conditional statement that began in Line 20. Line 27 moves to the next record to be copied. Line 28 goes back to the first "Do" statement (started in Line 1) and repeats the loop until the computer program goes though all records.

The invention can be used in a system with different versions configured for different operating environments. For example, in a telephony communications system, the environmental if-statement feature can be pre-programmed for versions with functional features that are pre-selected for different user groups such as large-scale metropolitan users, mid-level user groups or small businesses. Then, the computer program can create pre-determined sets of documentation customized for each version, depending on the current operating environment.

2. Automated Translations

The automated translation feature permits the user to work with the information while it is displayed in the native language, and then to view, save, or print the finalized material in the desired foreign language. Note that the text substitution routine described herein uses previously translated text.

The user can utilize the automated translation feature of the invention by going through steps illustrated in FIG. 3 and described below. The user first selects the automated translation feature from the on-screen GUI functions. To create documentation in the computer program, the user must select the language of output as in Step 301. The translated output is accomplished by naming each text table according to its language, e.g., Text English, Text French, etc. The computer program assembles a string (as shown in Step 302) that populates the data control with a reference to the selected language, i.e., "Text(SelectedLanguage)." Depending on which language is selected by the user, "SelectedLanguage" is replaced with a literal that points to the desired text table containing identically tagged text strings in the various languages. See Step 303. The computer program then retains the text from the text table corresponding to the selected language to include in the customized documentation, as illustrated in Step 304.

Table 3 (below) is a more detailed illustration of the operation of the automated translation feature in pseudo code, as follows:

```
1.   If Area = 2 Then
2.       dataOutputLanguage.Recordset.Bookmark =
         cboOutputLanguage.SelectedItem
```

-continued

Table 3 (below) is a more detailed illustration of the operation of the automated translation feature in pseudo code, as follows:

```
3.    selOutputLanguage =
      dataOutputLanguage.Recordset("LanguageTable").Value
4.    End IF
5.    Dim srchsect As String
6.    srchsect = "SELECT DISTINCTROW Text" &
      selOutputLanguage & ".TextID, Text" & selOutputLanguage &
      ".TextString, . . . FROM . . . INNER JOIN Item . . . WHERE . . ."
7.    dataTextOfSelectedLanguage.RecordSource = srchsect
8.    dataTextOfSelectedLanguage.Refresh
```

Referring to Table 3, Line 1 starts a conditional statement when the end user picks a language of output from the list. Line 2 sets the data bookmark to the item currently selected in the "selOutputLanguage" on-screen dialog box, as in Step 301 of FIG. 3. Line 3 then assigns the value of the table associated with the selected language to the variable named "selOutputLang." This is included in the variable string that assembles the text blocks from the appropriate language database. Line 4 marks the end of the conditional statement.

The computer program then proceeds to assemble a string to hold the value for the text of the selected language. Line 5 holds the variable string that populates the data control for the text of selected language ("dataTextOfSelectedLanguage"). Line 6 builds the variable string that populates the named data control in the database. Line 7 then writes the content of the variable string to the "RecordSource" property of the data control. Line 8 re-evaluates the variable string for this data control and updates all connected controls. The string is assembled for a customized text output of the documentation in the language selected by the user.

Figure 4A:
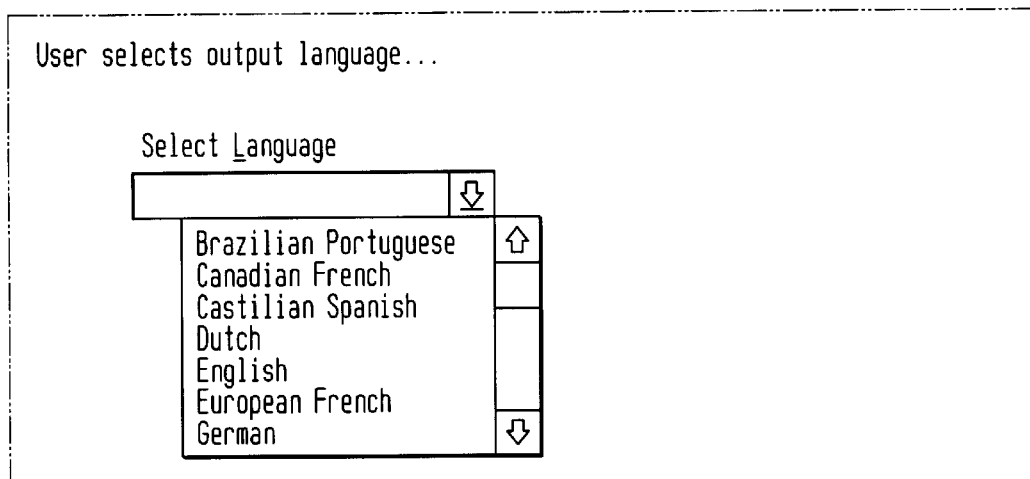
FIG. 4A shows a dialog box in the automated translation feature.
Figure 4B:
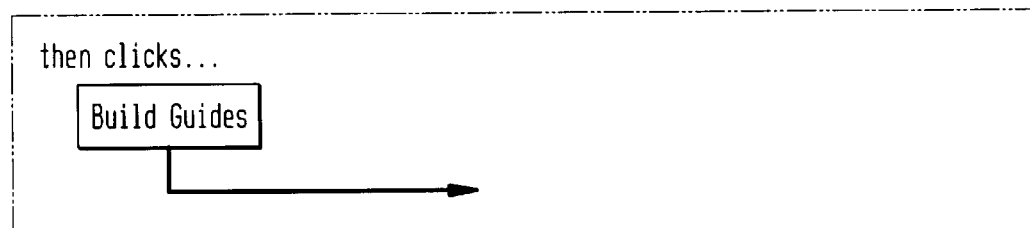
FIG. 4B shows the operation of the "Build Guides" icon in the automated translation feature.
Figure 4C:
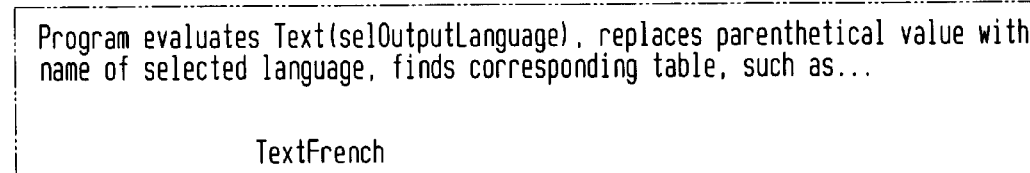
FIG. 4C shows the operation of language text selection in the automated translation feature.

FIGS. 4A, 4B and 4C illustrate different parts of the automated translation feature in the invention. The end-user first selects the output language in the dialog box as shown in FIG. 4A. For later processing, the computer program retains a value, i.e., "selOutputLanguage," for the language selected. For example, the user can choose French by selecting from the menu of languages in the dialog box. Referring to FIG. 4B, the user then clicks on the on-screen button of "Build Guides" (as described hereinabove) to start the document customization process. The computer program then evaluates the value in "Text(selOutputLanguage)" and replaces the parenthetical value with the name of the language selected. See FIG. 4C. The computer program has a series of tables that correspond to each language in the dialog box menu. The computer program goes through the series of tables to find the table that corresponds to the language selected, e.g., the table of "TextFrench" as shown in FIG. 4C. The computer program then pulls the text information from the "TextFrench" table to create the customized documentation.

Note that the automated translation feature can be used in conjunction with the environmental if-statement process (described hereinabove) when creating customized documentation for specific end-users.

3. Button Labels

Referring to FIG. 5, the user can use the button label feature in the invention by going through the steps described below. Because designs are different for different telephone sets, the user first needs to choose a particular telephone design from the on-screen GUI functions, as in Step 501. The button label feature in the invention next requires the user to specify a single telephone or a range of telephones, as in Step 502. The user can choose to label each telephone by its corresponding extension or telephone number in Step 503. From the on-screen GUI functions, the user can also choose different labels customized to show specific functions relevant to the telephone system selected, e.g., auto callback, auto dial, or type in information free-form, as shown in Step 504.

Depending on whether the user selects a single telephone or a range of telephones, the button label feature is handled in slightly different ways that are illustrated herein.

Referring to FIG. 6A, if the user chooses to create individual cards for each telephone, the button label feature in the invention stores each cell address and its content in a concatenated string within the database for the telephone system. An exemplary series of concatenated strings for individual telephones is shown in FIG. 6A. When the user decides to print these cards, the computer program runs the standard "Print" routine (as shown in FIG. 6C) as described herein.

Referring to FIG. 6B, if the user chooses to create a range of cards, the button label feature in the invention first verifies the correct format of the telephone numbers and checks its consistency. Each number is broken down into chunks, separated by hyphens. For example, the telephone number 732-555-1212 (as shown in FIG. 6B) is broken down to chunks of 732, 555 and 1212. The computer program increments the last chunk (e.g., 1212 in 732-555-1212) by converting it into a whole number, adding 1 for each new card, and converting it back to a string that can be re-padded with preceding zeroes, if appropriate. In essence, the button label feature increments the last chunk by advancing it to the next number for each phone within the designated range. The computer program then reunites the different "chunks" into complete telephone numbers. Next, the computer program runs the standard "Print" routine (FIG. 6C) as described herein.

Referring to FIG. 6C, during the "Print" routine, the computer program calculates the total number of cards required, then assembles each card using a series of nested loops within the computer program. The series of nested loops (as shown in FIG. 6C), using a common algorithm, determines the placement of each label on the card. The outer loop returns to its beginning until the maximum number of cards have been printed on the page vertically. The middle loop returns to its beginning until the maximum number of cards have been printed across the page horizontally. The computer program first works horizontally, then vertically to complete each page. The inner loop returns to its beginning until each cell within the card has been printed or accounted for.

Table 4 (below) is a detailed illustration of the nested loop print routine in the button label feature in pseudo code, as follows:

```
1.    Public Sub PrintCards( )
2.    Do Until PrintedFinalCard = True
3.    PageCountup = PageCountup + 1
4.    Do Until VerticalCountup > NumberCardsVerticallyPerPage
5.    Do Until HorizontalCountup > NumberCardsHorizontallyPerPage
6.    Form ButtonLabel DesignationCards.dataGlobal3.Refresh
7.    Do
8.    dataColumnCurrent.Recordset.MoveFirst
9.    Do
10.   LeftMeasurement = . . .
11.   TopMeasurement = . . .
12.   Printer.CurrentX = LeftMeasurement
13.   Printer.CurrentY = TopMeasurement
14.   Printer.Print dataColumnCurrent.Recordset ("ColumnCurrent")
```

-continued

Table 4 (below) is a detailed illustration of the nested loop print routine in the button label feature in pseudo code, as follows:

```
15.    dataColumnCurrent.Recordset.MoveNext
16.    Loop Until dataColumnCurrent.Recordset.EOF = "True"
17.    Loop Until dataColumnCurrent.Recordset.EOF = "True"
18.    HorizontalCountup = HorizontalCountup + 1
19.    Loop
20.    HorizontalCountup = 1
21.    VerticalCountup = VerticalCountup + 1
22.    Loop
23.    HorizontalCountup = 1
24.    VerticalCountup = 1
25.    If PrintedFinalCard < > "True" Then
26.    Printer.NewPage
27.    End IF
28.    Loop
29.    Printer.EndDoc
```

Referring to Table 4, Line 2 starts a loop statement that executes until the final card has been printed (Line 28). Line 3 recalculates the page on which the computer program is operating. Line 4 marks the beginning of the vertical loop that ends with Line 22. Line 5 is the beginning of the horizontal loop that ends with Line 19. Line 6 then re-evaluates the variable string for this data control and updates all connected controls in the database.

Line 7 starts another "Do" statement that prints the content of the text in the current column. Line 8 activates the first record set in the data control in the current column. Line 9 starts a loop that continues to the "Loop Until" Line 16. Line 10 then calculates the appropriate left measurement based on entries in the database. Line 11 calculates the appropriate top measurement based on entries in the database. Line 12 sets the "X" grid (which specifies horizontal placement) to the newly calculated "LeftMeasurement." Line 13 sets the "Y" grid (which specifies vertical placement) to the newly calculated "TopMeasurement."

Line 14 then proceeds to print the record set of the current column. Line 15 moves to the next record. Line 16 marks the end of the loop (Line 9) and repeats the loop until at the end of file. Line 17 marks the end of the loop (Line 7) and repeats the loop until at the end of file.

Line 18 recalculates the horizontal count-up. When the computer program gets to the number that will fit across the page, it will exit this loop. Line 19 marks the end of the horizontal loop (Line 5). Line 20 resets the horizontal count-up to the first position across the page. Line 21 recalculates the vertical count-up. When it gets to the number that will fit down the page, it will exit this loop. Line 22 marks the end of the vertical loop (Line 4).

Line 23 resets the horizontal count-up to the first position across the page. Line 24 resets the vertical count-up to the first position down the page. Line 25 starts a conditional statement to see if the computer program should start a new page because it has not reached the last card. Line 26 spools the current page to the printer. Line 27 marks the end of the conditional statement that began in Line 25. Line 28 marks the end of the page loop that started in Line 2. Line 29 then releases the entire customized document to the printer.

4. Platform Sharing

The platform sharing feature of the invention allows the user to edit and customize a set of applications without burdening the computer with multiple versions of platform software to support each application. This inventive feature essentially operates as a universal documentation interface for groups of similar applications implemented by the computer.

The Guide Builder™ software is used herein to describe platform sharing in the invention. Platform sharing is accomplished by using a consistent file and database structure across various Guide Builder™ applications, a master database that defines the attributes (and capabilities) for each application, and a series of executables that launch the next appropriate component.

Figure 7:
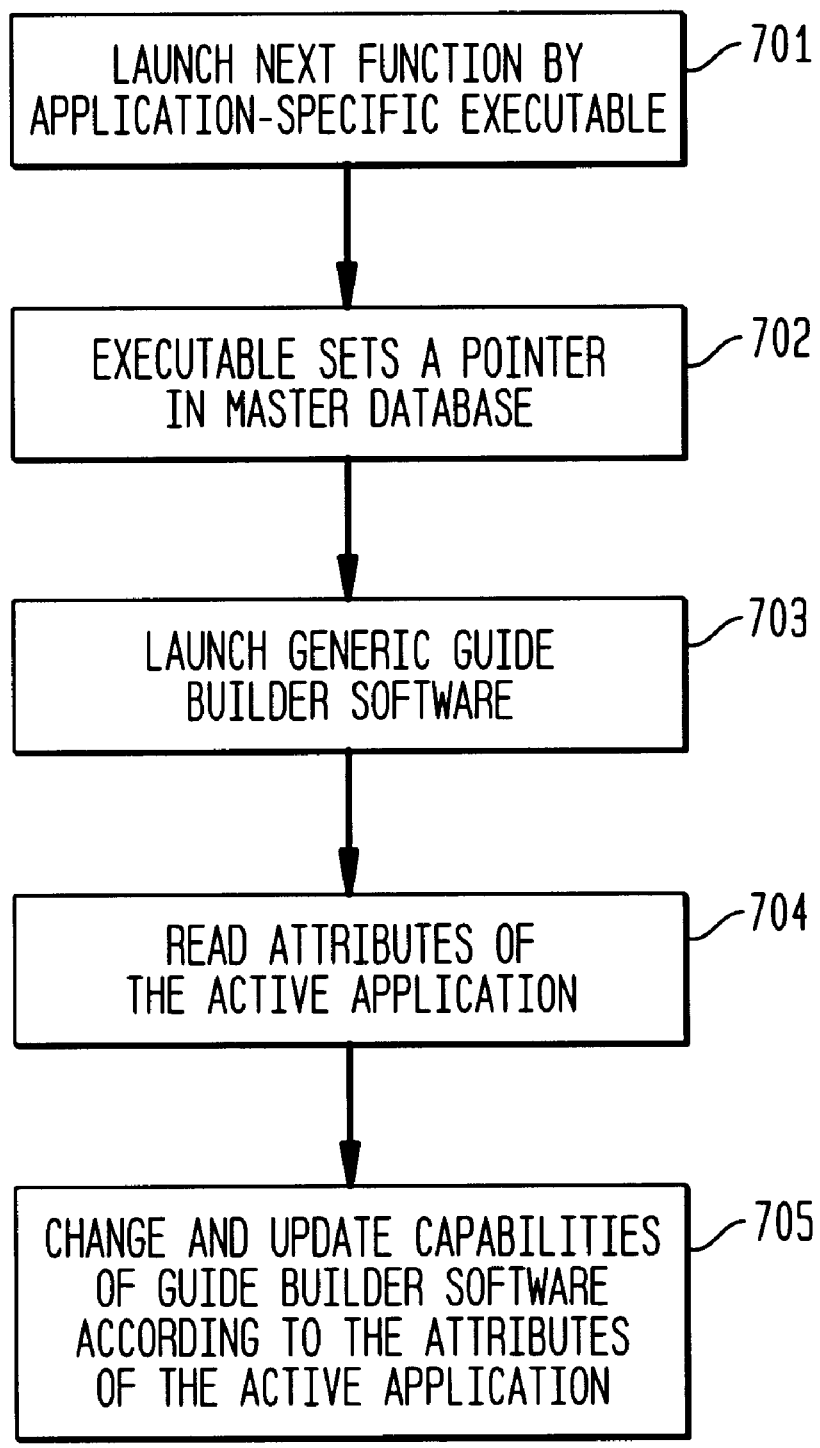
FIG. 7 illustrates the platform sharing feature in the invention.

Referring to FIG. 7, the end-user can utilize the platform sharing feature by going through the steps described below. The computer program launches the next application by implementing application-specific executables, as in Step 701. The application-specific executable sets a "pointer" in the master database (Step 702) to use the specified version of the Guide Builder™ application. The computer program then launches the generic Guide Builder™ software application in Step 703.

During the launch of the generic Guide Builder™ application, the computer program reads the attributes of the active application from the master database, as shown in Step 704. Based on the attributes obtained in Step 704, the computer program then changes the captions and capabilities of the Guide Builder software, as illustrated in Step 705.

Figure 8:
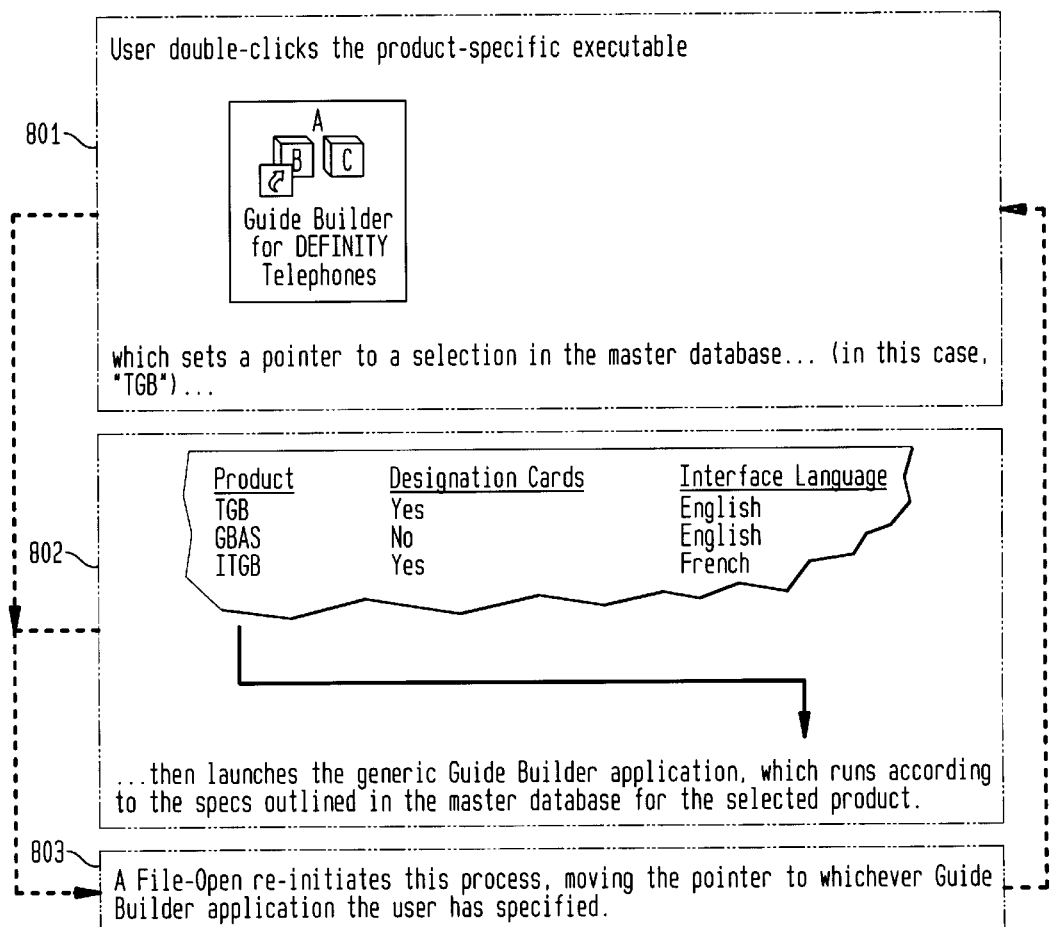
FIG. 8 illustrates the operation of the platform sharing feature in the invention.

FIG. 8 illustrates the operation of the platform sharing feature with DEFINITY®, a Lucent Technologies, Inc. product. Referring to 801, the end-user first clicks on the product-specific executable icon on screen. The product-specific executable function then sets a pointer in the master database to use the specified version of the Guide Builder™ software product, e.g., "TGB", as illustrated. The computer program then refers to a pre-existing table (as shown in 802) to obtain specifications needed when running the product "TGB" and launches the generic Guide Builder™ software application. During the launch, the computer program changes the captions and capabilities of the Guide Builder™ software according to the specifications assigned to "TGB" in the master database.

If the user clicks on "File-Open" (803) from the menu bar on screen, the computer program re-initiates the process in 801 and 802 and moves the pointer to whichever Guide Builder™ software application the end-user has specified. The computer program then launches the selected version of the Guide Builder™ software with customized captions and capabilities according to its specifications in the database.

Referring to 803 in FIG. 8, if the end-user selects "File-Open" from the on-screen GUI functions for the generic Guide Builder™ software, the computer program first locates the "Open" executable function that can launch a fresh iteration of the computer program. Then, the computer program launches an "Open" executable function that compares the applications listed in the master database to those actually residing therein as sub-directories of the Guide Builder™ software application. In the interim, the generic Guide Builder™ software application is shut down.

The "Open" executable function lists all of the applications that actually reside in the Guide Builder™ software directory. When the user selects an application from on-screen GUI displays and clicks OK, the "Open" executable function moves the pointer within the master database to the selected version. Once again, the computer program launches the generic Guide Builder™ software application and then shuts down the "Open" executable function. This cycle continues until the user exits the Guide Builder™ software, where the computer program releases and enables the master database to be launched for use at a later time.

In general, platform sharing in Guide Builder™ involves a number of stages, as described below. First, the computer program launches the product-specific executable. Then, the generic Guide Builder™ software is launched. Finally, the user has an option to launch the "Open" executable as well. An illustration is found in the description accompanying Table 5.

Table 5 (below) is a more detailed illustration of the sub-routines used in the operation of the platform sharing feature in pseudo code. Referring to Table 5, as follows:

| | |
|---|---|
| 1. | Private Sub Application_Load( ) |
| 2. | Locate master.mdb |
| 3. | Open master.mdb |
| 4. | LastPart = ApplicationInUse; if NONE, mark ApplicationNonActive |
| 5. | dataAllGuideBuilders.RecordSource = "SELECT * FROM AllGuideBuilders WHERE DataFolder like" & Chr(34) & LCase(LastPart) & Chr(34) & ";" |
| 6. | dataAllGuideBuilders.Refresh |
| 7. | dataAllGuideBuilders.MoveFirst |
| 8. | dataAllGuideBuilders.Recordset.Edit |
| 9. | dataAllGuideBuilders.Recordset("Selected") = "1" |
| 10. | dataAllGuideBuilders.Recordset.Update |
| 11. | AppAddress = FirstPart & "WIN\GBUILDER.EXE" |
| 12. | MyApp = Shell(AppAddress, 1) |
| 13. | AppActivate MyApp |
| 14. | End |
| 15. | Else AlreadyActive |
| 16. | End Sub |
| 17. | Public Sub GuideBuilderStartup( ) |
| 18. | dataAllGuideBuilders.RecordSource = "SELECT * FROM AllGuideBuilders WHERE Selected = 1" |
| 19. | SelectedProduct = dataAllGuideBuilders.Recordset("DataFolder") |
| 20. | DataPath = PrimaryPath & SelectedProduct & "\db.mdb" |
| 21. | End Sub |
| 22. | Private Sub mnuOpen_Click( ) |
| 23. | AppAddress = PrimaryPath & "WIN\OPEN.EXE" |
| 24. | MyApp = Shell(AppAddress, 1) |
| 25. | AppActivate MyApp |
| 26. | End |
| 27. | Exit Sub |
| 28. | Private Sub cmdOK_Click( ) |
| 29. | SelectedProduct = dataAllGuideBuilders.Recordset("DataFolder") |
| 30. | dataAllGuideBuilders.RecordSource = "SELECT * FROM AllGuideBuilders WHERE DataFolder like" & Chr(34) & LCase(SelectedProduct) & Chr(34) & ";" |
| 31. | dataAllGuideBuilders.Recordset.Edit |
| 32. | dataAllGuideBuilders.Recordset("Selected") = "1" |
| 33. | dataAllGuideBuilders.Recordset.Update |
| 34. | AppAddress = PrimaryPath & "WIN\GBUILDER.EXE" |
| 35. | MyApp = Shell(AppAddress, 1) |
| 36. | AppActivate MyApp |
| 37. | End |
| 38. | Exit Sub |

Referring to Table 5, Line 1 is the beginning of the product-specific executable routine that the user launches by double-clicking a Guide Builder™ icon, as in 801 of FIG. 8. The sub-routine in Line 1 ends with line 16. Line 2 locates the master database residing in the main Guide Builder™ directory. Line 3 opens the master database. Line 4 looks for any Guide Builder™ application that is already in use. If it found no open applications, then it marks all Guide Builder™ applications as being non-active.

Line 5 locates the application database that corresponds to the directory name of the Guide Builder™ application that the user chose to launch. Line 6 re-evaluates the variable string for the current data control and updates all connected controls in the database. Line 7 activates the first record set in the data control. Line 8 opens the current record for editing. Line 9 marks (by setting a flag) the selected application so the next executable can locate it and run it. Also see Step 702 of FIG. 7. Line 10 writes the changed values to the database.

Lines 11 through 14 locate and launch the generic Guide Builder™ executable function, and shut down the currently running product-specific executable. Otherwise, Line 15 informs the user that Guide Builder™ is already running. Note that it does not halt the original Guide Builder™ application. Line 16 marks the end of the sub-routine.

Line 17 marks the beginning of the start-up routine in the generic Guide Builder™ software that ends with Line 21. Lines 18 and 19 put the appropriate application-specific database path and name in the "DatabaseName" property of the data control on the form. Line 20 establishes the "Data-Path" variable that is used to populate the database name and location in all data controls throughout the computer program. Line 21 marks the end of the start-up sub-routine that began in line 17.

Line 22 is the routine that runs when the user selects "File-Open" from the generic Guide Builder™ executable function. Lines 23 and 24 locate the "Open" executable function that can launch a fresh iteration of Guide Builder™. Line 25 launches the "Open" executable function. Line 26 shuts down the generic Guide Builder™ application. Line 27 exits the sub-routine that began with Line 22.

Line 28 is the beginning of the "OK" routine in the "Open" executable. Line 29 determines which Guide Builder™ application the user has selected. Line 30 selects the corresponding Guide Builder™ in the master database and begins operation on it. Line 31 then opens the selected application in the master database for editing. Line 32 sets the selected flag in the master database to "True" for the application by the user. Line 33 updates the record set for the selected application. Lines 34 through 36 select and launch the generic Guide Builder™ application. Line 37 exits this executable.

CONCLUSION

The invention comprises of four features: (1) the environmental if-statement process for customizing documentation on a user- or environment-specific basis, (2) customized, automated translation of documentation, (3) button labeling of individual telephones or a range of telephones for a telephony system, and (4) platform sharing of computer-implemented applications.

Changes and modifications in the specifically described embodiments can be carried out without departing from the scope of the invention. In particular, the present invention may be used in preparing customized documentation based on user-specific data. Although preferred embodiments are disclosed herein, they do not limit the scope of the present invention.

We claim:

1. A computer-implemented method for providing documentation having a specific relationship to user-selectable features in a system, the method comprising the steps of:

establishing an association between portions of said documentation and particular user-selectable features;

assigning a plurality of if-statements to said associated portion of said documentation, wherein each one of said plurality of if-statements includes a correspondence to one or more of said user-selectable features;

identifying a set of features amono said user-selectable features in said system;

comparing said identified selected features with said plurality of if-statements;

selecting portions of said documentation corresponding to if-statements matching said identified selected features, an aggregate of said selected portions constituting said provided documentation;

choosing a language of output by said user;

creating a text table containing previously translated texts of said documentation in a plurality of pre-determined languages;

embedding tags in said text table that correlate said translated texts with texts in said documentation;

comparing said customized text for said documentation with said embedded tags; and selecting portions of said customized text for said documentation corresponding to tags matching said identified selected features, an aggregate of said selected portions constituting said provided documentation.

2. The method as in claim 1, said identifying step further comprising the steps of:

creating a table of values that correspond to all features in said system; and assembling a string containing values in said table that correspond to said identified selected features in said identifying step.

3. The method as in claim 1, said comparing step further comprising the steps of:

searching in said documentation for said plurality of if-statements; and comparing values in said string with said plurality of if-statements found in said searching step.

4. The method as in claim 1, said selecting step further comprising the step of selecting portions of said documentation corresponding to if-statements matching said values in said string.

5. The method as in claim 1, further comprising the steps of:

compiling pre-determined versions of said system for operating in different user environments;

customizing sets of features corresponding to each said pre-determined version; and establishing an association between portions of said documentation and particular user-selectable features for comparing said identified selected features with said plurality of if-statements.

* * * * *